United States Patent
Li et al.

(10) Patent No.: US 12,217,518 B2
(45) Date of Patent: Feb. 4, 2025

(54) METHOD AND APPARATUS WITH OBJECT DETECTION

(71) Applicant: Samsung Electronics Co., Ltd., Suwon-si (KR)

(72) Inventors: Weiming Li, Beijing (CN); Jiyeon Kim, Hwaseong-si (KR); Qiang Wang, Beijing (CN); Hyun Sung Chang, Seoul (KR); Sunghoon Hong, Hwaseong-si (KR); Chao Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 17/529,634

(22) Filed: Nov. 18, 2021

(65) Prior Publication Data

US 2022/0164565 A1    May 26, 2022

(30) Foreign Application Priority Data

Nov. 26, 2020   (CN) .......................... 202011354655.0
Jul. 6, 2021   (KR) ......................... 10-2021-0088389

(51) Int. Cl.
  *G06V 20/64* (2022.01)
  *G06V 10/44* (2022.01)

(52) U.S. Cl.
  CPC .............. *G06V 20/64* (2022.01); *G06V 10/44* (2022.01)

(58) Field of Classification Search
  CPC ......... G06V 20/64; G06V 10/44; G06V 20/20
  See application file for complete search history.

(56) References Cited

U.S. PATENT DOCUMENTS

| | | |
|---|---|---|
| 2019/0043253 A1 | 2/2019 | Lucas et al. |
| 2019/0172249 A1 | 6/2019 | Kaza et al. |
| 2020/0111237 A1 | 4/2020 | Tourapis et al. |
| 2020/0151512 A1 | 5/2020 | Corral-Soto et al. |
| 2020/0182626 A1 | 6/2020 | He et al. |
| 2020/0200905 A1 | 6/2020 | Lee et al. |
| 2020/0273241 A1 | 8/2020 | Cai et al. |

FOREIGN PATENT DOCUMENTS

CN    110827202 A   *   2/2020   ........... G06T 3/4053

OTHER PUBLICATIONS

"Mingtao Feng et. al., Relation Graph Network for 3D Object Detection in Point Clouds, IEEE Transactions on Image Processing vol. 30, Oct. 2020" (Year: 2020).*
"Han Hu et. al., Relation Networks for Object Detection, Proceedings of the IEEE Conference on Computer Vision and Pattern Recognition CVPR, 2018, pp. 3588-3597" (Year: 2018).*
"Guan Pang et. al., Automatic 3D Industrial Point Cloud Modeling and Recognition, 2015 14th IAPR International Conference on Machine Vision Applications MVA, Jul. 2015" (Year: 2015).*

(Continued)

*Primary Examiner* — Andrae S Allison
*Assistant Examiner* — Phuong Hau Cai
(74) *Attorney, Agent, or Firm* — NSIP Law

(57) ABSTRACT

A method with object detection includes obtaining a first point cloud feature based on point cloud data of an image and determining at least one object in the image based on the first point cloud feature.

19 Claims, 9 Drawing Sheets

(56) References Cited

OTHER PUBLICATIONS

"Helmi Ben Hmida et. al., Knowledge Base Approach for 3D Objects Detection in Point Clouds Using 3D Processing and Specialists Knowledge, Artificial Intelligence, International Journal On Advances in Intelligent Systems 5, 1, et 2 2012, 1-14" (Year: 2012).*

"Charles R. Qi et. al., Deep Hough Voting for 3D Object Detection in Point Clouds, 2019, Proceedings of the IEEE/CVF International Conference on Computer Vision ICCV, pp. 9277-9286" (Year: 2019).*

Bae, Hyojoon, et al. "High-precision vision-based mobile augmented reality system for context-aware architectural, engineering, construction and facility management (AEC/FM) applications" *Visualization in Engineering a SpringerOpen Journal* 2013 (13 pages in English).

Yu, Lequan, et al. "Pu-Net: Point Cloud Upsampling Network." *Proceedings of the IEEE Conference on Computer Vision and Pattern Recognition* 2018 pp. 2790-2799.

Yew, Zi Jian, et al. "3DFeat-Net: Weakly Supervised Local 3D Features for Point Cloud Registration." *Proceedings of the European Conference on Computer Vision (ECCV)* 2018 (17 pages in English).

Chen, Rui, et al. "Point-based multi-view stereo network." *Proceedings of the IEEE/CVF International Conference on Computer Vision* 2019 pp. 1538-1547.

Zhang, Zhiyuan, et al. "Global Context Aware Convolutions for 3D Point Cloud Understanding." *International Conference on 3D Vision (3DV)* arXiv:2008.02986v1 IEEE, Aug. 7, 2020 (14 pages in English).

* cited by examiner

METHOD AND APPARATUS WITH OBJECT DETECTION

CROSS-REFERENCE TO RELATED APPLICATIONS

This application claims the benefit under 35 USC § 119(a) of Chinese Patent Application No. 202011354655.0 filed on Nov. 26, 2020, in the China National Intellectual Property Administration, and Korean Patent Application No. 10-2021-0088389 filed on Jul. 6, 2021, in the Korean Intellectual Property Office, the entire disclosures of which are incorporated herein by reference for all purposes.

BACKGROUND

1. Field

The following description relates to image processing and, for example, a method and apparatus for detecting objects.

2. Description of Related Art

Augmented reality (AR) provides a user with real information experience by adding virtual content to a real scene in front of the user. In three-dimensional (3D) space, an AR system requires high-precision real-time processing and understanding of 3D states of surrounding objects in order to present high-quality virtual and real fusion effects to users.

However, the existing AR techniques are limited due to the operation principle of depth sensors during object detection and recognition. Thus, it is difficult to perform object detection and recognition effectively and accurately.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with object detection includes: obtaining a first point cloud feature based on point cloud data of an image; and determining at least one object in the image based on the first point cloud feature.

The method may further include performing point cloud complement on the point cloud data of the image, prior to the obtaining of the first point cloud feature. The obtaining of the first point cloud feature may include obtaining the first point cloud feature based on the complemented point cloud data.

The performing of the point cloud complement on the point cloud data of the image may include: extracting a high-dimensional feature of the point cloud data of the image; and obtaining the complemented point cloud data by complementing a point cloud based on the high-dimensional feature.

The determining of the at least one object in the image may include: obtaining first appearance features and first geometric features of respective objects in the image based on the first point cloud feature; obtaining a relationship weight between candidate regions corresponding to the respective objects in the image, based on the first appearance features and the first geometric features of the respective objects in the image; obtaining second appearance features and second geometric features of the respective objects in the image, based on the first point cloud feature and the relationship weight; and determining the at least one object in the image, based on the second appearance features and the second geometric features of the respective objects in the image.

The obtaining of the second appearance features and the second geometric features of the respective objects in the image may include: obtaining a geometric weight between the candidate regions, based on the first geometric features of the respective objects in the image; obtaining an appearance weight between the candidate regions, based on the first appearance features of the respective objects in the image; obtaining the relationship weight between the candidate regions, based on the geometric weight and the appearance weight; obtaining a second point cloud feature, based on the first point cloud feature and the relationship weight; and obtaining the second appearance features and the second geometric features of the respective objects in the image, based on the second point cloud feature.

The obtaining of the geometric weight between the candidate regions may include: obtaining a geometric feature-related vector between the candidate regions based on the first geometric features of the respective objects in the image; and obtaining the geometric weight between the candidate regions based on the geometric feature-related vector between the candidate regions.

The first geometric features, the second geometric features, and the geometric feature-related vector may be related to any one or any combination of any two or more of center positions, sizes, and orientations of the objects.

The method may further include rendering a virtual object in an augmented reality system, based on the determining of the least one object in the image.

In another general aspect, a non-transitory computer-readable storage medium stores instructions that, when executed by a processor, cause the processor to perform the method described above.

In another general aspect, an apparatus with object detection includes: a feature obtainer configured to obtain a first point cloud feature based on point cloud data of an image; and an object determiner configured to determine at least one object in the image based on the first point cloud feature.

The apparatus may further include a complementor configured to perform point cloud complement on the point cloud data of the image. The feature obtainer may be further configured to obtain the first point cloud feature based on the complemented point cloud data.

The complementor may be further configured to extract a high-dimensional feature of the point cloud data of the image and obtain the complemented point cloud data by complementing a point cloud based on the high-dimensional feature.

The object determiner may be further configured to: obtain first appearance features and first geometric features of respective objects in the image, based on the first point cloud feature; obtain a relationship weight between candidate regions corresponding to the respective objects in the image, based on the first appearance features and the first geometric features of the respective objects in the image; obtain second appearance features and second geometric features of the respective objects in the image, based on the first point cloud feature and the relationship weight; and determine the at least one object in the image, based on the second appearance features and the second geometric features of the respective objects in the image.

The object determiner may be further configured to, when obtaining the second appearance features and the second geometric features of the respective objects in the image: obtain a geometric weight between the candidate regions, based on the first geometric features of the respective objects in the image; obtain an appearance weight between the candidate regions, based on the first appearance features of the respective objects in the image; obtain the relationship weight between the candidate regions, based on the geometric weight and the appearance weight; obtain a second point cloud feature, based on the first point cloud feature and the relationship weight; and obtain the second appearance features and the second geometric features of the respective objects in the image, based on the second point cloud feature.

The object determiner may be further configured to, when obtaining the geometric weight between the candidate regions: obtain a geometric feature-related vector between the candidate regions, based on the first geometric features of the respective objects in the image; and obtain the geometric weight between the candidate regions, based on the geometric feature-related vector between the candidate regions.

The first geometric features, the second geometric features, and the geometric feature-related vector may be related to any one or any combination of any two or more of center positions, sizes, and orientations of the objects.

In another general aspect, an electronic device includes: a memory configured to store instructions that are executable; and at least one processor configured to obtain a first point cloud feature based on point cloud data of an image and determine at least one object in the image based on the first point cloud feature, in accordance with the instructions.

The at least one processor may be further configured to, prior to the obtaining of the first point cloud feature, perform point cloud complement on the point cloud data of the image, and obtain the first point cloud feature based on the complemented point cloud data.

The at least one processor may be further configured to render a virtual object in augmented reality, based on the determining of the least one object in the image.

Other features and aspects will be apparent from the following detailed description, the drawings, and the claims.

Figure 1:
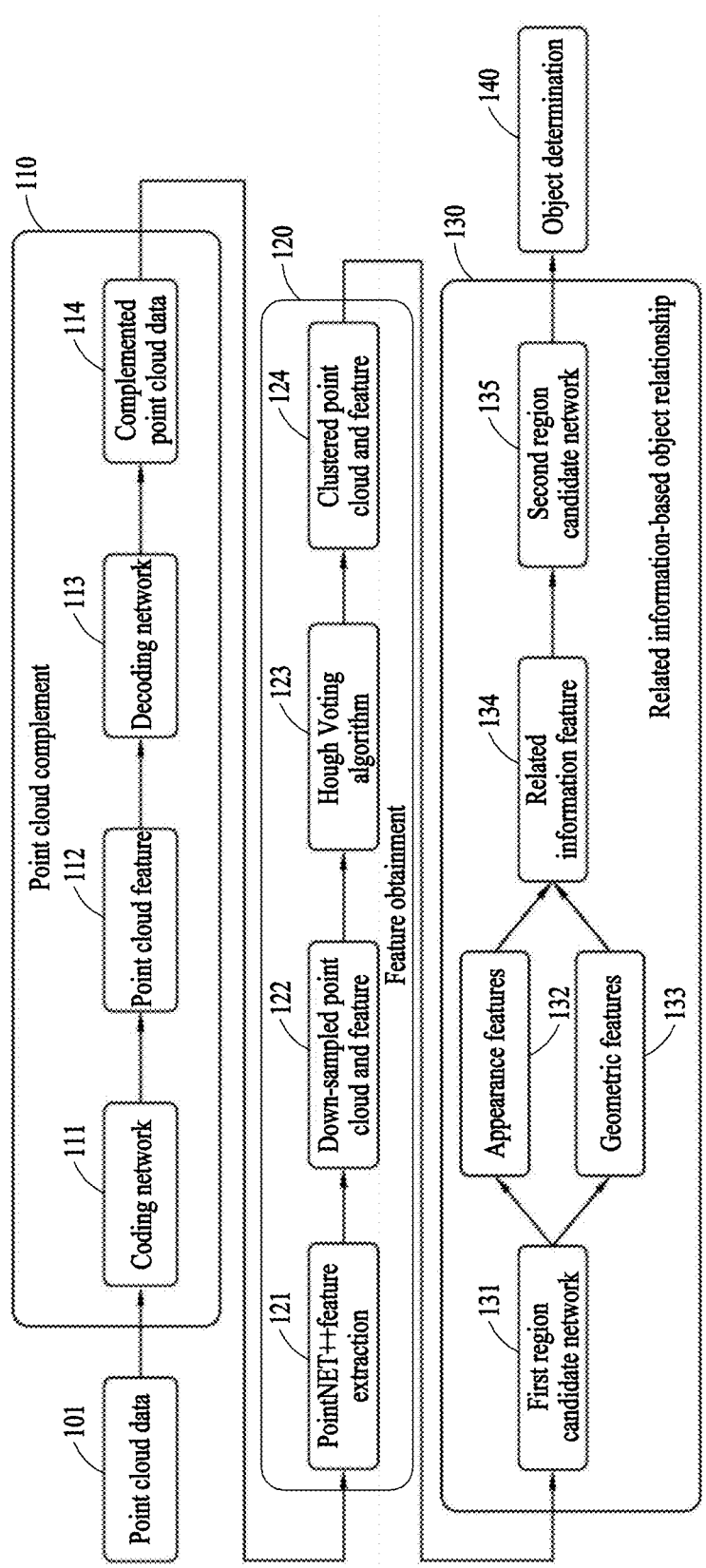
FIG. 1 illustrates an example of a method of detecting objects.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms including technical and scientific terms used herein have the same meaning as commonly understood by in the art to which example embodiments belong, in consideration of the context of the disclosure herein. It will be further understood that terms, such as those defined in commonly-used dictionaries, should be interpreted as having a meaning that is consistent with their meaning in the context of the relevant art and the disclosure herein, and will not be interpreted in an idealized or overly formal sense unless expressly so defined herein.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples of an object detection method and apparatus will be described in detail with reference to FIGS. 1 to 10.

FIG. 1 illustrates an example of a method of detecting objects.

Referring to FIG. 1, upon receiving point cloud data 101 of an image, an object detection apparatus may perform point cloud complement in operation 110, obtain a first point cloud feature based on the complemented point cloud data in operation 120, verify an object relationship based on information related to objects in operation 130, and determine at least one object in the image in operation 140.

An example process of operation 110 of performing the point cloud complement is as follows.

In operation 110, the object detection apparatus extracts a point cloud feature 112 that is a high-dimensional feature of the point cloud data 101 of the image using a coding network 111. Then, in operation 110, the object detection apparatus obtains point cloud-complemented point cloud data 114 based on the point cloud feature 112 using a decoding network 113.

An example process of operation 120 of obtaining the first point cloud feature is as follows.

In operation 120, the object detection apparatus may obtain a down-sampled point cloud feature 122 by performing PointNet++ feature extraction 121 on the complemented point cloud data 114. Then, in the operation 120, the object detection apparatus may perform a Hough Voting algorithm 123 on the down-sampled point cloud feature 122, thereby obtaining a point cloud feature 124, (e.g., a first point cloud feature 124), corresponding to the geometric center of an object after clustering.

An example process of operation 130 of verifying the object relationship is as follows.

In operation 130, object detection apparatus may obtain first appearance features 132 and first geometric features 133 of respective objects in the image based on the first point cloud feature 124 using a first region candidate network 131. Then, in operation 130, the object detection apparatus may obtain a related information feature 134 based on the first appearance feature 132 and the first geometric feature 133. Thereafter, in operation 130, the object detection apparatus may obtain second appearance features and second geometric features of the respective objects in the image based on the first point cloud feature and the related information feature 134 using a second region candidate network 135.

An example process of operation 140 of determining the object is as follows.

In operation 140, the object detection apparatus may determine at least one object in the image based on the second appearance features and the second geometric features of the respective objects in the image using the second region candidate network 135.

Figure 2:
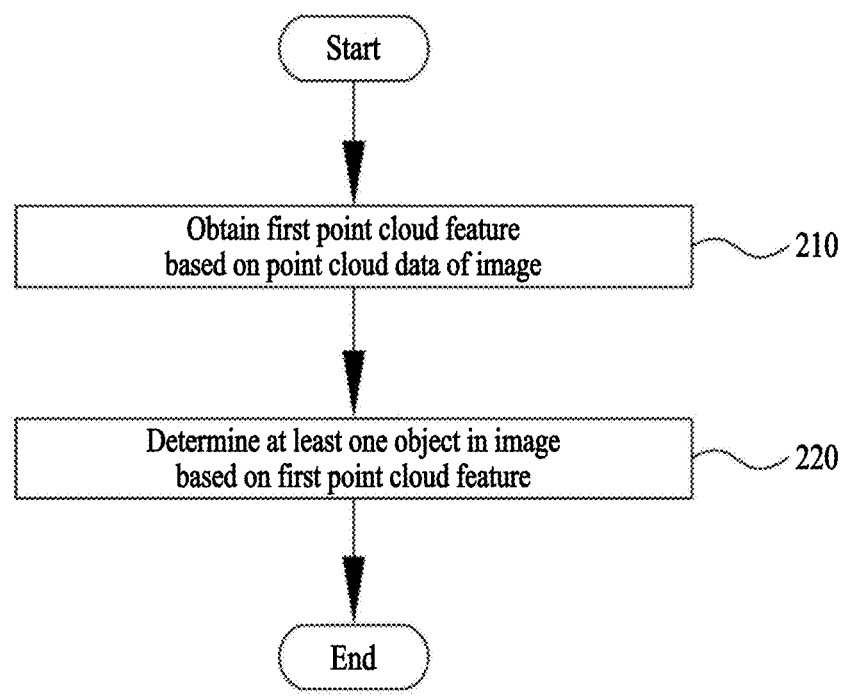
FIG. 2 illustrates an example of a schematic process of detecting objects.

FIG. 2 illustrates an example of a schematic process of detecting objects.

Referring to FIG. 2, in operation 210, the object detection apparatus may obtain a first point cloud feature based on point cloud data of an image. For example, the object detection apparatus may obtain a down-sampled point cloud feature 122 by performing PointNet++ feature extraction 121 on the point cloud data of the image, as in the example of FIG. 1 described above. Then, the object detection apparatus may perform a Hough Voting algorithm 123 on the down-sampled point cloud feature 122, thereby obtaining a point cloud feature 124, that is, a first point cloud feature, corresponding to the geometric center of an object after clustering. The PointNet++ feature extraction and Hough Voting algorithm described herein are non-limiting examples, and the first point cloud feature may be obtained using another algorithm.

In operation 220, the object detection apparatus may determine at least one object in the image based on the first point cloud feature. In addition, before obtaining the first point cloud feature, the object detection apparatus may perform point cloud complement on the point cloud data of the image, and obtain a clustered point cloud feature based on the point-cloud complemented point cloud data, in operation 220.

Hereinafter, the point cloud complement operation, according to an example, will be described further with reference to FIGS. 3 to 5, and operation 220 will be described further with reference to FIG. 6.

Point cloud data obtained by a depth sensor may include data that are missing due to occlusion, surface reflection, transparency, and other objects and, thus, have a large number of holes. Such an incomplete point cloud greatly affects the three-dimensional (3D) object detection performance. Thus, the disclosure herein may add a point cloud complement task.

Figure 3:
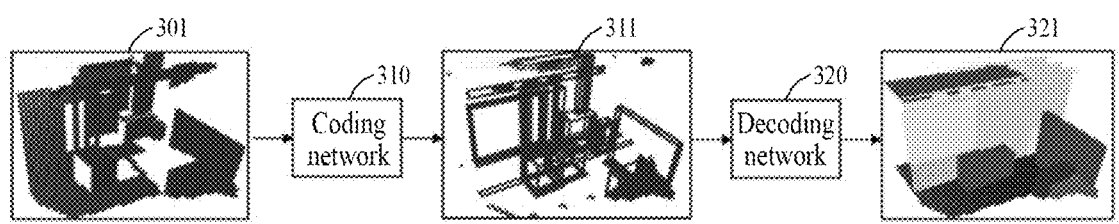
FIG. 3 illustrates an example of complementing point cloud data.

FIG. 3 illustrates an example of complementing point cloud data. FIG. 4 illustrates an example of a process of complementing point cloud data. FIG. 5 illustrates an example of an effect of complementing point cloud data.

Figure 4:
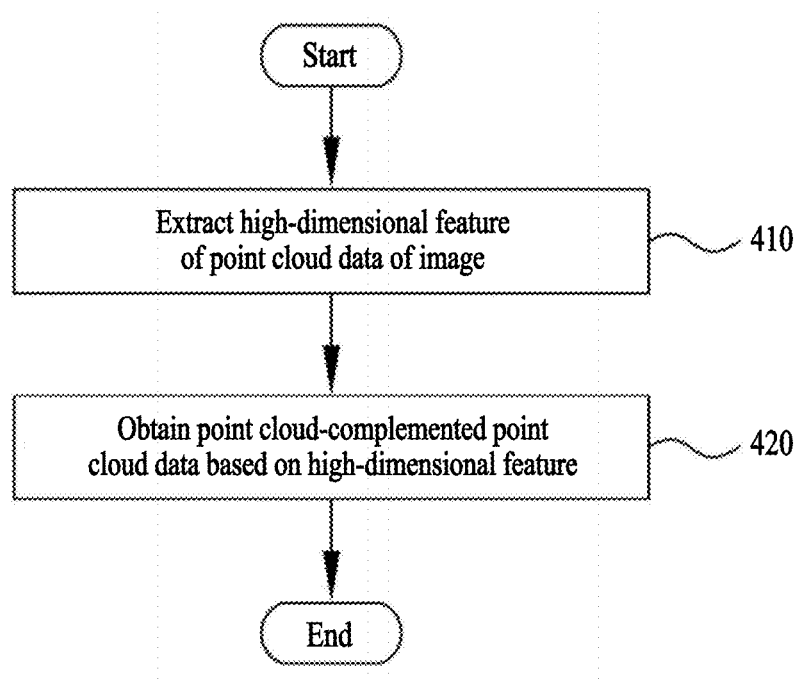
FIG. 4 illustrates an example of a process of complementing point cloud data.

Referring to FIGS. 3 and 4, in operation 410, the object detection apparatus may extract a high-dimensional feature 311 of point cloud data 301 of an image.

Operation 410 may be performed by a coding network 310. The coding network 310 is a non-limiting example, and may be a deep learning network based on convolutional neurons, or nodes. The original point cloud data 301 may be input to the coding network 310, and the coding network 310 may output the high-dimensional feature 311 extracted by the coding network, which may describe the shape and boundary of the object. In addition, the coding network 310 may have various forms, and the extracted high-dimensional feature may be any one or any combination of any two or more of a semantic feature of an object category, a contour feature of an object, and a depth information feature, or a combination thereof. The aforementioned features are in common in that, even if some of the point cloud data are missing in a situation where the actual data are not changed, the extracted features may be unaffected or less affected by the missing data, and are basically unchanged.

In operation 420, the object detection apparatus may obtain complemented point cloud data 321 by complementing the point cloud data based on the high-dimensional feature 311.

Operation 420 may be performed by a decoding network 320, and the complemented point cloud data 321 may have the same size as the point cloud data 301. The decoding network 320 is a non-limiting example, and may be a deep learning network based on convolutional neurons, or nodes. A feature map (including the high-dimensional features 311) output from the coding network 310 may be input to the decoding network 320, and the decoding network 320 may output the complemented and dense point cloud data 321.

Figure 5:
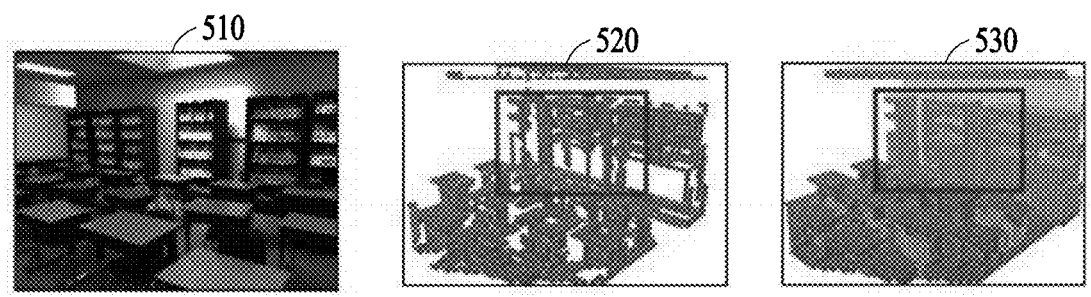
FIG. 5 illustrates an example of an effect of complementing point cloud data.

Referring to FIG. 5, a box 510 shows an image of a real scene, a box 520 shows point cloud data having a large number of holes, and a box 530 shows complemented point cloud data in which the holes in the point cloud data are complemented. With regard to data missing occurring in the point cloud data, it is possible to obtain higher quality point cloud data by filling in the missing holes in a point cloud through a neural network model of a coder and decoder (CODEC) network structure.

Figure 6:
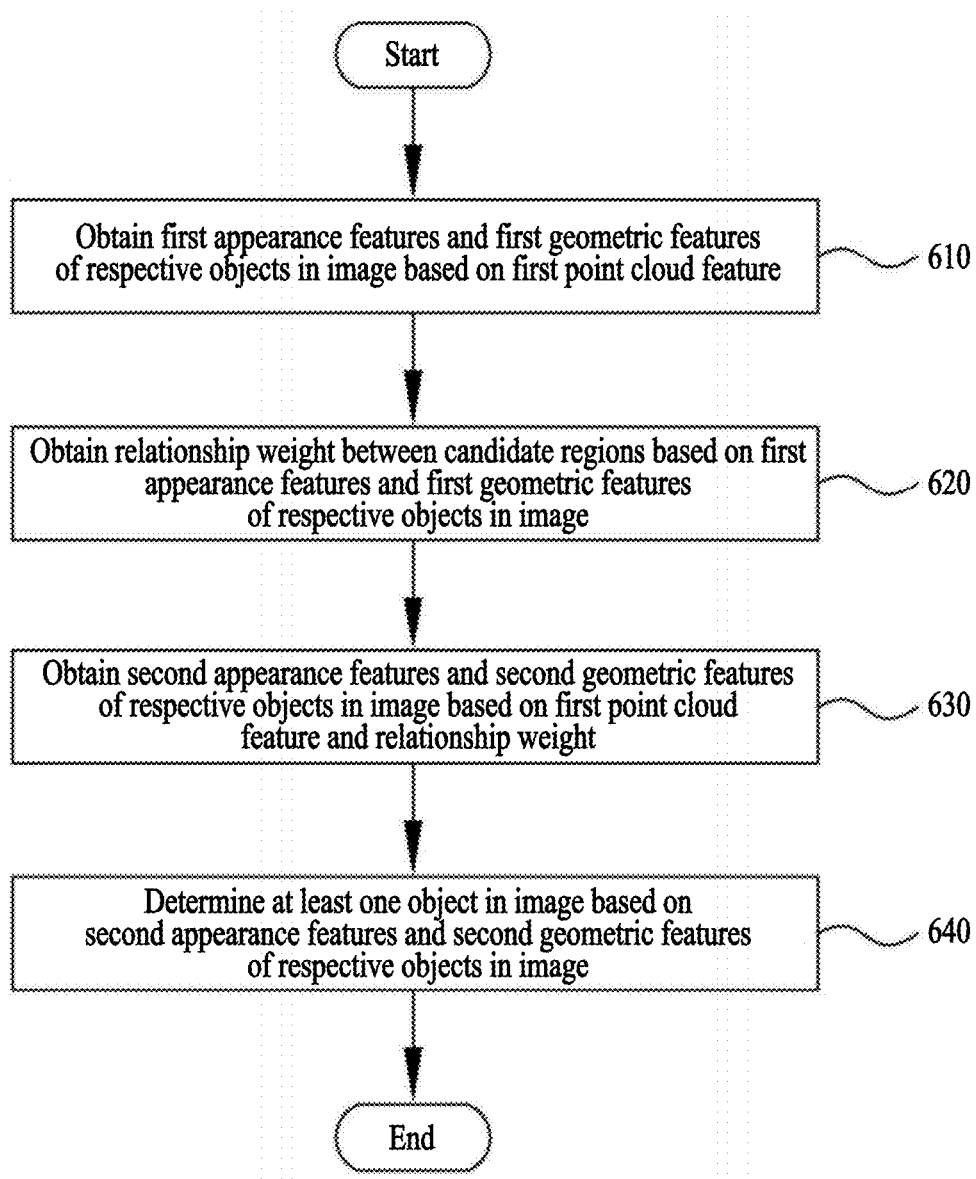
FIG. 6 illustrates an example of a process of determining objects.

FIG. 6 illustrates an example of a process of determining objects.

Referring to FIG. 6, in operation 610, the object detection apparatus may obtain first appearance features and first geometric features of respective objects in an image based on a first point cloud feature. The geometrical features are non-limiting examples and may be related to any one or any combination of any two or more of center positions, sizes, and orientations of the objects.

In operation 620, the object detection apparatus may obtain a relationship weight between two candidate regions based on the first appearance features and the first geometric features of the respective objects in the image. In this case, the candidate regions correspond to the objects.

In operation 630, the object detection apparatus may obtain second appearance features and second geometric features of the respective objects in the image based on the first point cloud feature and the relationship weight.

In operation 640, the object detection apparatus may determine at least one object in the image based on the second appearance features and the second geometric features of the respective objects in the image. As a more specific example, the categories, center positions, sizes, and directions of the objects may be determined by inputting the appearance features and geometric features of the objects to a predetermined neural network. In this case, the predetermined neural network may be a deep learning network having a multi-layer perceptron (MLP) structure.

When an object is occluded, in a cut FOV, or small, it is difficult to effectively and accurately detect and recognize the object.

Multiple objects have a predetermined coexistence relationship therebetween (for example, a mouse is usually next to a keyboard), and the sizes of the objects also have a predetermined relationship (for example, several chairs of the same size are usually next to a table), and the orientations of the object generally also follow fixed patterns and habits (for example, a bedside table and a bed are arranged in parallel). That is, the degree of relation between objects is strongly correlated to the categories, positions, sizes, and orientations of the objects.

After clustering on the point cloud feature, considering the features of other objects related to a current object in an environment in operation 640 of determining the at least one object in FIG. 6 and predicting the categories, geography, and sizes using the point cloud feature as an input greatly helps to improve the accuracy of determining the current object. Hereinafter, operations 610 to 630, according to examples, will be described in detail with reference to FIGS. 7 to 8.

Figure 7:
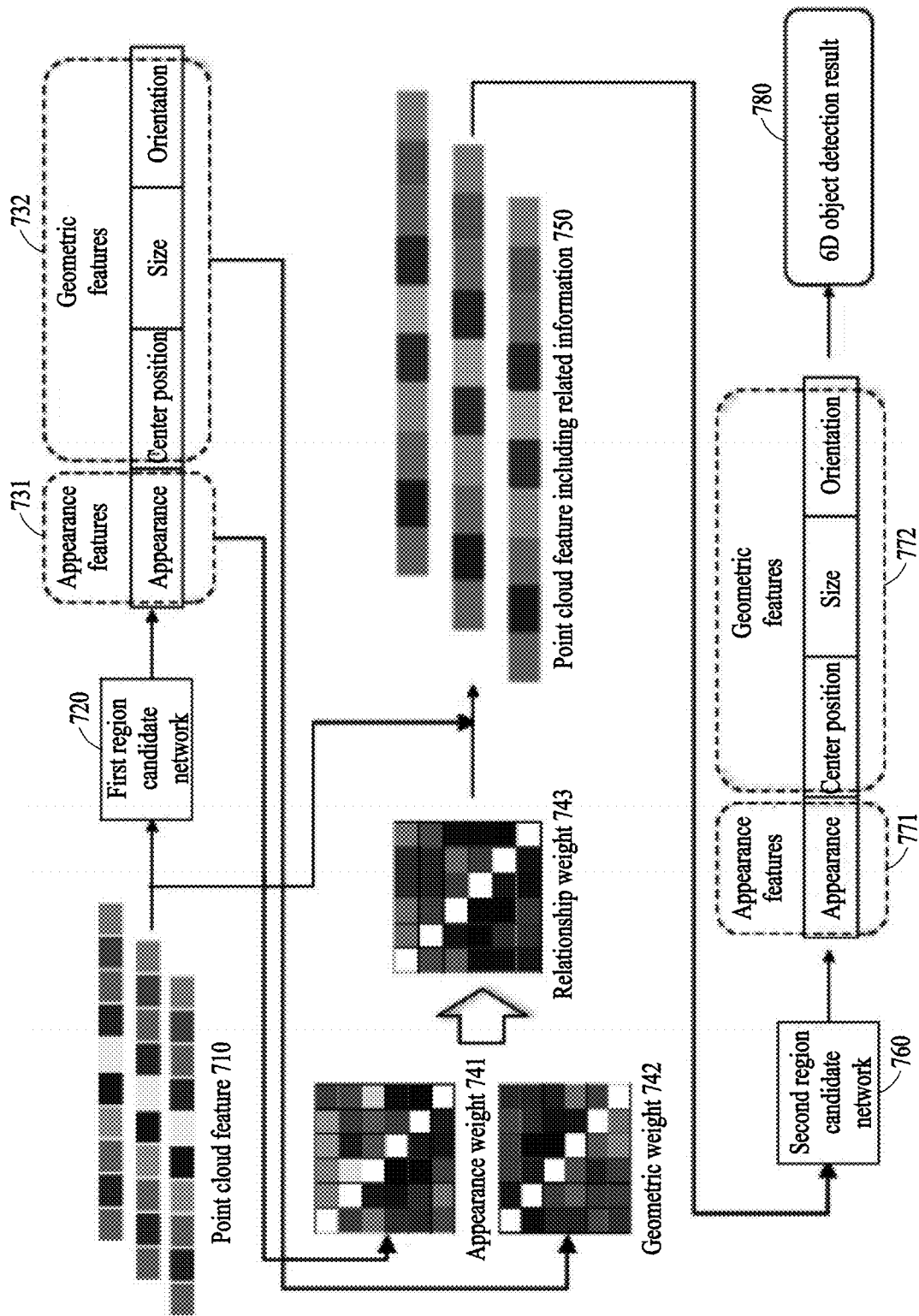
FIG. 7 illustrates an example of a process of obtaining and using appearance features and geometric features of objects.
Figure 8:
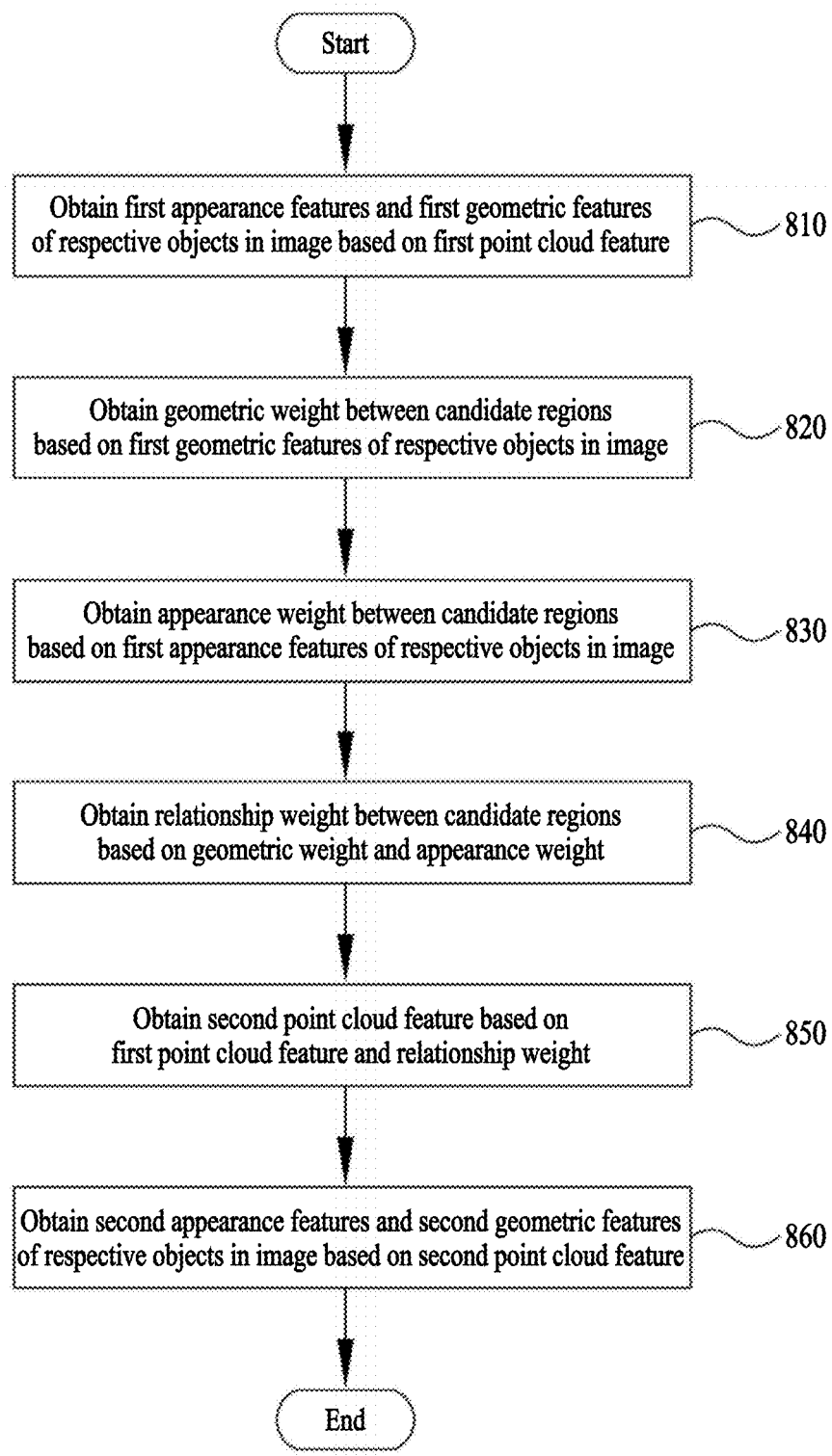
FIG. 8 illustrates an example of a process of obtaining appearance features and geometric features of objects.

FIG. 7 illustrates an example of a process of obtaining and using appearance features and geometric features of objects. FIG. 8 illustrates an example of a process of obtaining appearance features and geometric features of objects.

Referring to FIGS. 7 and 8, in operation 810, the object detection apparatus may obtain first appearance features 731 and first geometric features 732 of respective objects in an image based on first point cloud feature 710. Operation 810 may be performed by a first region candidate network 720, for example. As a more specific example, the first point cloud feature 710 of which the physical meaning is not clear may pass through the first region candidate network 720, and candidate regions corresponding to respective objects may obtain four different types of features, such as the first appearance features 731, corresponding to the appearances of the respective objects in the candidate regions and the first geometric features 732 corresponding to the center positions (x, y, z), sizes (width (w), height (h), depth (d)), and orientations (roll, pitch, yaw). In this case, the center positions (x, y, z), sizes (width (w), height (h), depth (d)), and orientations (roll, pitch, yaw) of the objects correspond to the first geometric features 732. As an example, the first region candidate network 720 may be a deep learning network based on convolutional neurons, or nodes, or a deep learning network having an MLP structure.

In operation 820, the object detection apparatus may obtain a geometric weight between two candidate regions based on the first geometrical features 732 of the respective objects in the image. More specifically, the object detection apparatus may obtain a geometric feature-related vector between the two candidate regions based on the first geometric features 720 of the respective objects in the image, and obtain a geometric weight 741 between the two candidate regions based on the geometric feature-related vector between the two candidate regions. The following Equation 1 shows a vector $\varepsilon_G$ related to geometric features $f_G^m$ and $f_G^n$ between two candidate regions m and n.

$$\varepsilon_G = \left[\log\left(\frac{|x_m - x_n|}{w_m}\right), \log\left(\frac{|y_m - y_n|}{h_m}\right), \log\left(\frac{|z_m - z_n|}{d_m}\right), \right. \\ \left. \text{dot}(roll_m, roll_n), \text{dot}(pitch_m, pitch_n), \text{dot}(yaw_m, yaw_n)\right] \quad \text{Equation 1}$$

In Equation 1, x, y, and z correspond to a center position feature of an object output by the first region candidate network. Additionally, w, h, and d correspond to a size feature of the object output by the first region candidate network. Additionally, roll, pitch, and yaw correspond to an orientation feature of the object output by the first region candidate network. Further, x, y, z, w, h, d, roll, pitch, and yaw with the subscript m or n respectively denote x, y, z, w, h, d, roll, pitch, and yaw of the candidate region m or n. $\varepsilon_G$ is a 6-dimensional vector related to the center position, size, and orientation of the object.

For example, operation 820 of obtaining the geometric weight between the candidate regions based on the geometric feature-related vector between the candidate regions may include an operation of mapping the six-dimensional vector $\varepsilon_G$ to a new feature space by inputting the vector to a neural network $W_G$ and calculating, as a geometric weight $w_G^{mn}$ between the two candidate regions m and n, the distance between vectors $f_G^m$ and $f_G^n$ of the two candidate regions in the high-dimensional space (that is, the new feature space described above). The neural network $W_G$ may be a deep learning network having an MLP structure. In addition, a positive value may be taken for the geometric weight $w_G^{mn}$ obtained through the following Equation 2.

$$\omega_G^{mn} = \max\{0, W_G \cdot \varepsilon_G(f_G^m, f_G^n)\} \quad \text{Equation 2}$$

In operation 830, the object detection apparatus may obtain an appearance weight 741 between the two candidate regions based on the first appearance features 731 of the respective objects in the image. For example, the object detection apparatus may map the appearance features $f_A^m$ and $f_A^n$ of the two candidate regions m and n to a new feature space by inputting the appearance features $f_A^m$ and $f_A^n$ to neural networks $W_K$ and $W_Q$, and then calculate an appearance weight $w_A^{mn}$ between the two candidate regions m and n through the following Equation 3. The neural networks $W_K$ and $W_Q$ may be, for example, deep learning networks having an MLP structure.

$$\omega_A^{mn} = \frac{\text{dot }(W_K f_A^m, W_Q f_A^n)}{\sqrt{d_k}} \quad \text{Equation 3}$$

In Equation 3, $d_k$ may be a predetermined constant representing a predetermined multiple of the number of candidate regions.

In operation 840, the object detection apparatus may obtain a relationship weight 743 between the two candidate regions based on the geometric weight wGmn 742 and the appearance weight wAmn 741. More specifically, the relationship weight wmn between the two candidate regions may be obtained through the following Equation 4.

$$\omega^{mn} = \frac{\omega_G^{mn} \cdot \exp(\omega_A^{mn})}{\sum_k \omega_G^{kn} \cdot \exp(\omega_A^{kn})} \quad \text{Equation 4}$$

In Equation 4, k may be a natural number from 1 to K, and K may be the number of candidate regions.

In operation 850, the object detection apparatus may obtain a second point cloud feature 750 based on the first point cloud feature 710 and the relationship weight 743. In this case, the second point cloud feature 750 may include related information. For example, the object detection apparatus may input the first point cloud feature $f^m$ to the neural network Wv through the following Equation 5, and then obtain the second point cloud feature $f_R(n)$ through weighted summation. The second point cloud feature 750 and the first point cloud feature 710 are the same in quantity and feature dimension. Here, the neural network Wv may be a deep learning network having an MLP structure.

$$f_R(n) = \sum_m \omega^{mn} \cdot (W_V \cdot f^m) \quad \text{Equation 5}$$

In Equation 5, m may be a natural number from 1 to K, and K may be the number of candidate regions.

In operation 860, the object detection apparatus may obtain second appearance features 771 and second geometric features of the respective objects in the image based on the second point cloud feature 750. In this case, operation 860 may be performed by a second region candidate network 760. The second region candidate network 760 may be a deep learning network based on convolutional neurons, or nodes, or a deep learning network having an MLP structure. The first region candidate network 720 and the second region candidate network 760 may use completely identical network structures and share/unshare network weights.

The second appearance features 771 and the second geometric features 772 are then used for object detection 780.

Figure 9:
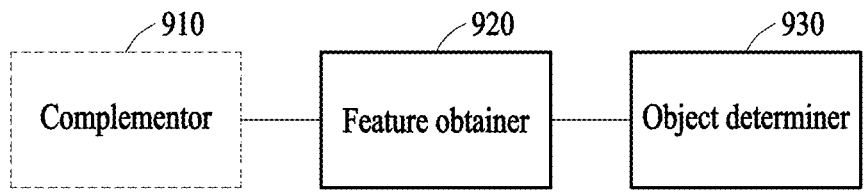
FIG. 9 illustrates an example of a schematic configuration of an object detection apparatus.

FIG. 9 illustrates an example of a schematic configuration of an object detection apparatus.

Referring to FIG. 9, an object detection apparatus may include a complementor 910, a feature obtainer 920, and an object determiner 930.

The complementor 910 may extract the point cloud feature 112 that is a high-dimensional feature of the point cloud data 101 of the image, and obtain point cloud-complemented point cloud data 114 based on the point cloud feature 112. In an example, the complementor 910 may not be included as an option.

The feature obtainer 920 may obtain a first point cloud feature based on the point cloud data of the image or the complemented point cloud data.

The object determiner 930 may determine at least one object in the image based on the first point cloud feature.

In addition, the object detection apparatus may further include the other elements to respectively implement features corresponding to other operations of the object detection method described above, and a duplicate description thereof will be omitted for conciseness.

Figure 10:
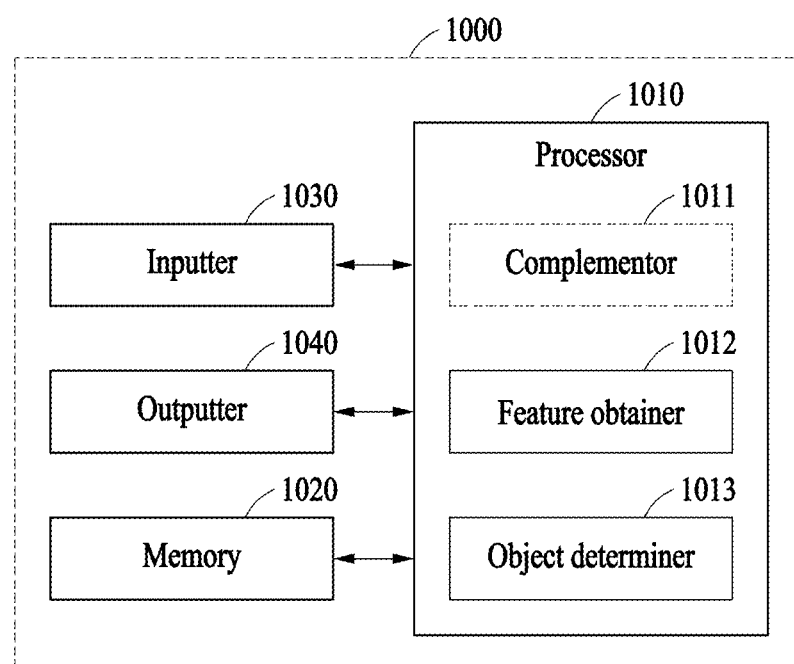
FIG. 10 illustrates an example of a schematic configuration of an electronic device for detecting objects.

FIG. 10 illustrates an example of a schematic configuration of an electronic device for detecting objects.

Referring to FIG. 10, an electronic device 1000 may include a processor 1010, a memory 1020, an inputter 1030, and an outputter 1040.

The memory 1020 may store an operating system, application program, and data for controlling the overall operation of the electronic device 1000, and store executable instructions for object detection according to the disclosure herein.

The inputter 1030 may receive point cloud data.

The outputter 1040 may output information related to at least one object in the image, detected by the processor 1010.

The processor 1010 may include a complementor 1011, a feature obtainer 1012, and an object determiner 1013.

The processor 1010 may perform point cloud complement on the point cloud data of the image through the complementor 1011 in accordance with the instructions stored in the memory 1020, obtain a first point cloud feature based on the complemented point cloud data through the feature obtainer 1012, and determine at least one object in the image based on the first point cloud feature through the object determiner 1013. The operation of the complementor 1011 is optional and may be omitted, in an example.

According to the present disclosure, the object detection method in the electronic device may obtain output data by recognizing an image or a point cloud feature in an image using image data as input data of an artificial intelligence model.

The artificial intelligence model may be obtained through training. Here, "being obtained through training" refers to obtaining the artificial intelligence model or pre-defined operation rules configured to perform a necessary feature (or objective) by training a basic artificial intelligence model having multiple training data through a training algorithm.

The artificial intelligence model may include multiple neural network layers. Each of the multiple neural network layers includes a plurality of weights and performs neural network computation through calculation between the weights.

Visual understanding is a technique of recognizing and processing objects, as in human visual perception, and includes, for example, object recognition, object tracking, image search, human recognition, scene recognition, 3D reconstruction/positioning, or image enhancement.

According to example embodiments, complementation of point cloud data may allow dealing with a shortage of holes in depth data due to object occlusion, reflection, and transparency, and improve the quality of data for object detection. In consideration of the relationship between objects, the accuracy and robustness of object detection or recognition performed for an object that is occluded, in a cut FOV, or small may be improved, through extraction and fusion of relational information between the objects. Based on the above solutions, a 6-DOF geometric estimation of a 3D object based on point cloud data may be performed, whereby the efficiency, accuracy, and robustness of the system in augmented reality applications may improve. The object detection method and apparatus may be used for AR systems and detection and 6-DOF geometric estimation of an object of interest in the vicinity of a user. Controlling a virtual object rendered in an AR system based on the obtained detection result may cause a realistic and natural interaction between a real object and a virtual object.

The coding networks 111 and 310, the decoding networks 113 and 320, the first region candidate networks 131 and 720, the second region candidate networks 135 and 760, the complementors 910 and 1011, the feature obtainers 920 and 1012, the object determiners 930 and 1013, the processor 1010, the inputter 1030, the outputter 1040, the memory 1020, the processors, and the memories in FIGS. 1 to 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for object identification based on point cloud features extracted from point cloud data corresponding to an image, the method comprising:
   generating first appearance features and first geometric features, both of respective objects of the image, dependent on the extracted point cloud features and correspondingly determined geometric centers of the respective objects; and
   identifying the respective objects by generating corresponding second appearance features and second geometric features based on:
      the extracted point cloud features of an object from the respective objects; and
      appearance relationship weightings and geometric relationship weightings, which are respectively based on the generated first appearance features and the generated first geometric features,
   wherein the second appearance features that correspond to the object are determined based on an application of a relationship weighting to the extracted point cloud features of the object, with the relationship weighting being based on both a corresponding one of the appearance relationship weightings and a corresponding one of the geometric relationship weightings; and
   controlling an operation of an augmented reality system based on the identified respective objects.

2. The method of claim 1, further comprising:
   performing point cloud complement on first point cloud data of the image to generate the point cloud data corresponding to the image; and
   performing the extracting of point cloud features from the generated point cloud data corresponding to the image.

3. The method of claim 2, wherein the performing of the point cloud complement on the point cloud data of the image comprises:
   extracting a high-dimensional feature of the first point cloud data of the image; and
   generating the complemented point cloud data by complementing a point cloud based on the high-dimensional feature.

4. A method with object detection, the method comprising:
   extracting respective first point cloud features of respective objects in an image from point cloud data corresponding to the image;
   generating first appearance features and first geometric features of respective objects in the image based on the respective first point cloud features;
   generating appearance relationship weightings and geometric relationship weightings between candidate regions corresponding to the respective objects in the image, based on the first appearance features and the first geometric features of the respective objects in the image;
   generating second appearance features and second geometric features of the respective objects in the image, based on the respective first point cloud features, the appearance relationship weightings, and the geometric relationship weightings;
   determining one object from the respective objects in the image, based on the second appearance features and the second geometric features corresponding to the one object; and
   controlling an operation of an augmented reality system based on the determined at least one object,
   wherein the obtaining of the second appearance features of the one object includes applying a relationship weight corresponding to the one object to the respective first point cloud features of the one object, where the relationship weight is based on the appearance relationship weighting corresponding to the one object and the geometric relationship weighting corresponding to the one object.

5. The method of claim 4, wherein the obtaining of the geometric weightings between the candidate regions comprises:
   obtaining a geometric feature-related vector between the candidate regions based on the first geometric features of the respective objects in the image; and
   obtaining the geometric weightings between the candidate regions based on the geometric feature-related vector between the candidate regions.

6. The method of claim 5, wherein the first geometric features, the second geometric features, and the geometric feature-related vector are related to any one or any combination of any two or more of center positions, sizes, and orientations of the objects.

7. The method of claim 1, further comprising rendering a virtual object in an augmented reality system, based on one of the identified respective objects.

8. A non-transitory computer-readable storage medium storing instructions that, when executed by a processor, cause the processor to perform the method of claim 1.

9. An apparatus for object identification based on point cloud features extracted from point cloud data corresponding to an image, the apparatus comprising:
one or more processors configured to:
generate first appearance features and first geometric features, both of respective objects of the image, dependent on the extracted point cloud features and correspondingly determined geometric centers of the respective objects; and
identify the respective objects by generating corresponding second appearance features and second geometric features based on:
the extracted point cloud features of an object from the respective objects; and
appearance relationship weightings and geometric relationship weightings, which are respectively based on the generated first appearance features and the generated first geometric features,
wherein the second appearance features that corresponds to the object are determined based on an application of a relationship weighting to the extracted point cloud features of the object, with the relationship weighting being based on both a corresponding one of the appearance relationship weightings and a corresponding one of geometric relationship weightings; and
control an operation of an augmented reality system based on the identified respective objects.

10. The apparatus of claim 9, wherein the one or more processors are configured to:
perform a point cloud complement on the first point cloud data of the image to generate the point cloud data corresponding to the image; and
performing the extracting of point cloud features from the generated point cloud data corresponding to the image.

11. The apparatus of claim 10, wherein, for the performing of the point cloud complement, the one or more processors are configured to extract a high-dimensional feature of the first point cloud data of the image and generate the complemented point cloud data by complementing a point cloud based on the high-dimensional feature.

12. The apparatus of claim 9, wherein, for the generating of the corresponding second appearance features and second geometric features, the one or more processors are configured to:
generate the appearance relationship weightings and the geometric relationship weightings; and
apply a relationship weight, generated based on the appearance relationship weightings and the geometric relationship weightings, to the extracted point cloud features of the object.

13. The apparatus of claim 12, wherein, for the generating of the geometric relationship weightings, the one or more processors are configured to:
generate a geometric feature-related vector between candidate regions corresponding to the respective objects dependent on the determined geometric centers; and
generate the geometric relationship weightings based on the geometric feature-related vector between the candidate regions.

14. The apparatus of claim 13, wherein the first geometric features, the second geometric features, and the geometric feature-related vector are related to any one or any combination of any two or more of center positions, sizes, and orientations of the objects.

15. An electronic device, comprising:
one or more processors configured to execute instructions; and
a memory configured to store the instructions, which when executed by the one or more processors configure the one or more processors to:
extract respective first point cloud features of respective objects in an image from first point cloud data corresponding to the image;
generate first appearance features and first geometric features of respective objects in the image based on the respective first point cloud features;
generate appearance relationship weightings and geometric relationship weightings between candidate regions corresponding to the respective objects in the image, based on the first appearance features and the first geometric features of the respective objects in the image;
generate second appearance features and second geometric features of the respective objects in the image, based on the respective first point cloud features, the appearance relationship weightings, and the geometric relationship weightings;
determine one object from the respective objects in the image based on the respective first point cloud feature for the multiple objects and the relationship weighting; and
control an operation of an augmented reality system based on the determined at least one object,
wherein the obtaining of the second appearance feature of the one object includes applying a relationship weight corresponding to the one object to the respective first point cloud features of the one object, where the relationship weight is based on the appearance relationship weighting corresponding to the one object and the geometric relationship weighting corresponding to the one object.

16. The electronic device of claim 15,
wherein the one or more processors are further configured to, prior to the extracting of the respective first point cloud features, perform point cloud complement on a point cloud data of the image to generate the first point cloud data.

17. The method of claim 4, wherein the controlling of the operation of the augmented reality system includes rendering a virtual object in augmented reality based on the determined one object.

18. The method of claim 1, wherein the first geometric features and the second geometric features respectively include position and orientation features.

19. The electronic device of claim 15, wherein, for the generating of the relationship weightings, the one or more processors are configured to:
generate a relationship vector between a first three-dimensional (3D) position and 3D orientation information of the respective first point cloud feature for the one object and a second 3D position and 3D orientation information of the respective first point cloud feature for another object; and generate the relationship weighting corresponding to the one object using a neural network provided an input depending on the generated relationship vector.

* * * * *